US012811812B2

(12) United States Patent
Tiku et al.

(10) Patent No.: US 12,811,812 B2
(45) Date of Patent: Nov. 24, 2026

(54) PASSIVE PHOTONIC PHYSICALLY UNCLONABLE FUNCTIONALITY FOR SECURING AN AUTOMOTIVE POWERTRAIN CONTROL AREA NETWORK

(71) Applicant: Micron Technology, Inc., Boise, ID (US)

(72) Inventors: Saideep Tiku, Fort Collins, CO (US); Febin Sunny, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 18/785,825

(22) Filed: Jul. 26, 2024

(65) Prior Publication Data

US 2025/0125978 A1 Apr. 17, 2025

Related U.S. Application Data

(60) Provisional application No. 63/589,521, filed on Oct. 11, 2023.

(51) Int. Cl.
*H04L 29/00* (2006.01)
*H04L 9/32* (2006.01)
*H04L 9/40* (2022.01)

(52) U.S. Cl.
CPC ........ *H04L 9/3278* (2013.01); *H04L 63/0428* (2013.01)

(58) Field of Classification Search
CPC ............... H04L 9/3278; H04L 63/0428; H04L 2209/84
See application file for complete search history.

(56) References Cited

U.S. PATENT DOCUMENTS 6,160,651 A * 12/2000 Chang ................. H04J 14/0278 398/1
8,213,751 B1 * 7/2012 Ho .......................... G02F 1/035 385/11
9,686,294 B2 * 6/2017 Kantor .................... H04W 4/40
9,814,387 B2 * 11/2017 Otis .................. A61B 5/14532
(Continued)

OTHER PUBLICATIONS

Sunny, Febin, et al., "A Silicon Photonic Accelerator for Convolutional Neural Networks with Heterogeneous Quantization", Jun. 6-8, 2022, Irvine, California, 5 pages.

*Primary Examiner* — Don G Zhao
(74) *Attorney, Agent, or Firm* — Brooks, Cameron & Huebsch, PLLC

(57) ABSTRACT

Apparatuses, non-transitory machine-readable media, and methods associated with passive photonic physically unclonable functionality for securing an automotive powertrain control area network are described herein. One apparatus includes a first network node communicatively connected via photonic interconnections to a second network node, the first network node has a passive photonic encryption unit for encrypting data packets by utilizing a microring resonator (MR) having at least one fabrication process variation (FPV) that is unique from the MRs of the other nodes, a decryption unit having a look up table (LUT) including at least one node identifier and containing information about at least one FPV of one of the network nodes to decrypt data packets, and a processing unit that processes the contents of the decrypted data packets.

22 Claims, 5 Drawing Sheets

(56) References Cited

U.S. PATENT DOCUMENTS

| | | | | |
|---|---|---|---|---|
| 9,875,378 | B2 * | 1/2018 | Benoit | G06F 21/79 |
| 9,940,446 | B2 * | 4/2018 | Miller | G06F 21/57 |
| 10,293,785 | B2 * | 5/2019 | Peeters | B60K 35/80 |
| 10,824,747 | B1 * | 11/2020 | Magerkurth | G06F 21/602 |
| 10,868,669 | B2 * | 12/2020 | Liu | H04L 9/0866 |
| 10,965,370 | B2 * | 3/2021 | Mansouri Rad | H04B 10/0795 |
| 11,741,243 | B1 * | 8/2023 | Matsumoto | G06F 21/602<br>380/28 |
| 11,874,501 | B1 * | 1/2024 | Nichols | G06E 3/001 |
| 12,010,248 | B2 * | 6/2024 | Jackson | H04L 63/0428 |
| 12,047,519 | B2 * | 7/2024 | Zheng | H04L 9/0841 |
| 12,443,761 | B2 * | 10/2025 | Askerov | H04L 9/0643 |
| 12,483,735 | B2 * | 11/2025 | Guim Bernat | G06F 12/0802 |
| 2002/0023223 | A1 * | 2/2002 | Schmidt | H04L 9/3263<br>713/175 |
| 2003/0039459 | A1 * | 2/2003 | Brambilla | C03C 3/078<br>385/132 |
| 2004/0234267 | A1 * | 11/2004 | Tsao | H04J 14/021<br>398/83 |
| 2007/0053400 | A1 * | 3/2007 | Sinha | H01S 3/07<br>372/64 |
| 2009/0214150 | A1 * | 8/2009 | Doerr | G02F 1/01708<br>385/3 |
| 2012/0179910 | A1 * | 7/2012 | Orsini | H04L 9/3231<br>713/167 |
| 2015/0222429 | A1 * | 8/2015 | Vilella | H04B 10/116<br>380/256 |
| 2016/0087687 | A1 * | 3/2016 | Kesler | H02J 50/80<br>307/104 |
| 2016/0150411 | A1 * | 5/2016 | Liu | H04L 63/0853<br>726/4 |
| 2016/0173498 | A1 * | 6/2016 | Liu | H04W 12/06<br>726/6 |
| 2016/0366156 | A1 * | 12/2016 | Kantor | H04L 63/20 |
| 2017/0063542 | A1 * | 3/2017 | Vilella | H04L 9/065 |
| 2017/0126414 | A1 * | 5/2017 | Goel | G06F 3/0679 |
| 2017/0180136 | A1 * | 6/2017 | Ibasco | H04L 63/0428 |
| 2017/0299649 | A1 * | 10/2017 | Coyne | G01R 31/2879 |
| 2017/0299650 | A1 * | 10/2017 | Coyne | G01R 31/2874 |
| 2018/0337957 | A1 * | 11/2018 | Chen | H04L 9/3268 |
| 2019/0289374 | A1 * | 9/2019 | Vilella | H04L 63/0414 |
| 2020/0041868 | A1 * | 2/2020 | Reddy | G02F 1/3544 |
| 2020/0125716 | A1 * | 4/2020 | Chittamuru | H04W 4/06 |
| 2020/0320340 | A1 * | 10/2020 | Wentz | G06F 18/22 |
| 2020/0351657 | A1 * | 11/2020 | Wentz | H04L 9/3231 |
| 2020/0380121 | A1 * | 12/2020 | Pasricha | G06F 21/554 |
| 2021/0288945 | A1 * | 9/2021 | Branscomb | H04L 63/166 |
| 2021/0328799 | A1 * | 10/2021 | Patel | H04L 63/0838 |
| 2022/0069990 | A1 * | 3/2022 | Ryckman | G01B 9/02051 |
| 2022/0158855 | A1 * | 5/2022 | Wentz | H04L 9/3247 |
| 2023/0032099 | A1 * | 2/2023 | Zheng | H04L 9/14 |
| 2023/0125556 | A1 * | 4/2023 | Moon | G06F 21/57<br>713/171 |
| 2023/0308866 | A1 * | 9/2023 | Yan | H04W 12/02 |
| 2024/0015225 | A1 * | 1/2024 | Tangirala | H04L 67/141 |
| 2024/0161877 | A1 * | 5/2024 | Jayachandran | G16B 50/40 |
| 2024/0177160 | A1 * | 5/2024 | Kaul | G06Q 20/4016 |
| 2024/0267224 | A1 * | 8/2024 | Chen | H04L 9/0863 |
| 2025/0125978 | A1 * | 4/2025 | Tiku | H04L 63/0428 |
| 2025/0211421 | A1 * | 6/2025 | Kumar | H04L 9/0637 |

* cited by examiner

PASSIVE PHOTONIC PHYSICALLY UNCLONABLE FUNCTIONALITY FOR SECURING AN AUTOMOTIVE POWERTRAIN CONTROL AREA NETWORK

PRIORITY INFORMATION

This application claims the benefit of U.S. Provisional Application No. 63/589,521, filed on Oct. 11, 2023, the contents of which are incorporated herein by reference.

TECHNICAL FIELD

The present disclosure relates generally to apparatuses, non-transitory machine-readable media, and methods associated with passive photonic physically unclonable functionality for securing an automotive powertrain control area network.

BACKGROUND

Devices having photonic components (a photonic device) can be utilized in many fields of technology. For instance, photonic components find prevalent usage in communication networks to send and receive packets of data within automotive vehicles.

Particular emphasis is on autonomous automotive vehicles, as these vehicles need to quickly collect data, move that data to a decision making computing device, make a decision based on the collected data, and implement an action or no action based on the decision in a near real-time timeframe. Examples of photonic components that are utilized in such networks are photonic waveguides, which can be provided within a photonic communication bus, and at least one component to send data and at least one component to receive data.

One issue that arises in their use is securitization of the network traffic and network components. This is because gateway devices can be part of a photonic network to allow access to the network, for example, for performing software updates or changing vehicle or performance data values, among other reasons for access. If nefarious individuals access the photonic network that controls powertrain functionality, they could adjust data to make the vehicle susceptible to crashing or potentially take control of the vehicle, among other issues.

Accordingly, the data packets communicating information within the photonic network can be encrypted. In this manner, the nefarious individuals would need to break the encryption in order to communicate with the network devices.

However, even typical encryption can be defeated if the encryption key is found. An encryption key contains the process of creating the encryption or information used to decrypt the encryption. Further, encryption adds data to the data packets making them more time consuming to encrypt-decrypt and reduces available bandwidth through the photonic network and takes energy to create the encryption, reducing the efficiency of the network.

DETAILED DESCRIPTION

Figure 1:
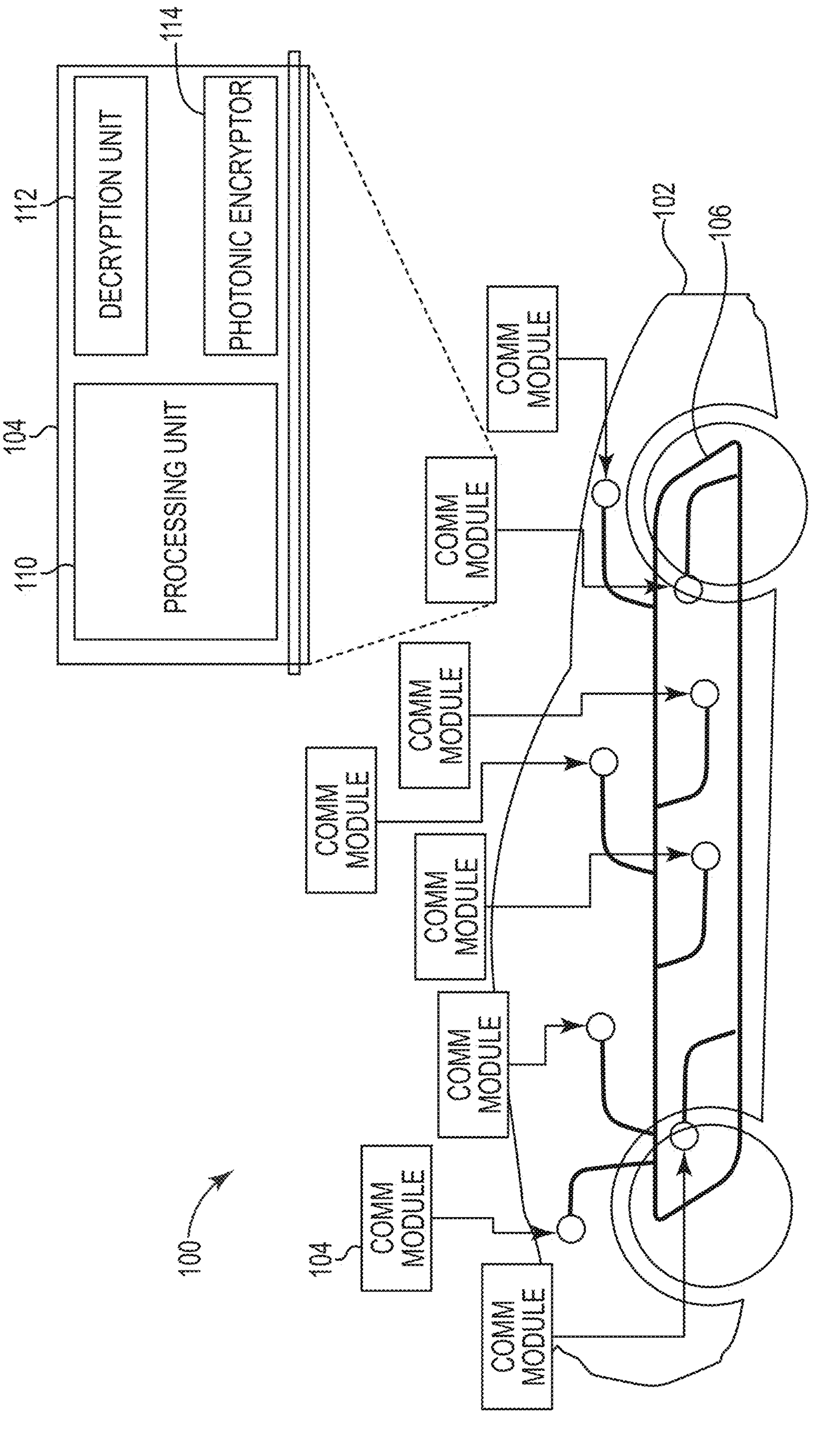
FIG. 1 illustrates an example of a photonic system in accordance with some embodiments of the present disclosure.

Apparatuses, machine-readable media, and methods associated with passive photonic physically unclonable functionality for securing an automotive powertrain control area network are disclosed herein. As discussed above, one issue that arises in their use is securitization of the network traffic and network components. For example, it may be possible by someone outside of the network to insert data packets into the network or change data in data packets within the network, which can create uncertainty of the data within the network or can override legitimate functional network instructions with illegitimate ones.

Embodiments of the present disclosure can include a communication module that includes a computational component (comm) having a processing unit, a photonic encryptor for securing by encrypting the data packets being sent, and a decryption unit for opening the encrypted data packets. In some embodiments the parts of the computational component may be separated into more than one physical component.

One example apparatus embodiment of the present disclosure includes a first network node communicatively connected via photonic interconnections to a second network node, the first network node has a passive photonic encryption unit for encrypting data packets by utilizing a microring resonator (MR) having at least one fabrication process variation (FPV) that is unique from the MRs of the other nodes, a decryption unit having a look up table (LUT) including at least one node identifier and containing information about at least one FPV of one of the network nodes to decrypt data packets, and a processing unit that processes the contents of the decrypted data packets. This and other embodiments of the present disclosure are discussed in more detail below.

An advantage of using photonic networks is that the network can transmit large data packets, such as those containing 256 bits of data or larger, simultaneously. This is because the signals can be transmitted photonically rather than electronically thereby increasing the speed at which the data is moved through the system.

This can allow a significant number of data packets to be transmitted in a short time period. This can be beneficial because it allows for greater throughput of data packets and/or overall speed of operation of the network as compared to a non-photonic network.

This can be particularly helpful in data intensive systems, such as automotive vehicle networks, like an autonomous vehicle control network, where the network has a lot of sensor data to process in a short period of time. Other data intensive systems can, for example, include machine learning or artificial intelligence systems.

With regard to encryption, embodiments of the present disclosure utilize unique properties of microring resonators (MRs) to passively encrypt the data packets due to unique characteristics of the particular MR (called fabrication process variations or FPVs) used to send the data packet, the unique characteristics created during the manufacturing process of creating each MR. Passive encryption does not increase the size of the data packet and requires no additional energy which can be beneficial in some implementations.

Passive encryption can be accomplished by providing one or more microring resonators (MRs) in the component sending the data packet, which are wavelength selection components that can be used to select one or more wavelengths on which a data packet is transmitted. Such MRs can be provided in an MR bank (a group of MRs), for example.

To decrypt these passively encrypted packets, a look up table (LUT) can be used that has node identifiers and corresponding ($\mu$, $\sigma$) variations of the encryption MR or MR bank for each network node where $\sigma$ is a gain-tuning signal. Node identifiers in the LUT are used to correlate the node in the network that sent the data packet with particular data in the LUT that contains the unique information that will be used to decrypt the encrypted data packet. This is accomplished by having a node identifier associated with a particular node of the network that correlates with a node identifier in the LUT that is associated with information about how to use the unique FPV characteristics of the MR to decrypt the data received from that particular node.

FIG. 1 illustrates an example of a photonic system in accordance with some embodiments of the present disclosure. FIG. 1 illustrates a system 100 having an interconnected network of automotive processing modules 104 in a vehicle (e.g., an autonomous vehicle) 102 connected using photonic interconnections (e.g., fiber optic waveguides) 106 instead of electrical interconnections. The automotive processing modules 104 include a photonic encryptor 114, a decryption unit 112, and a processing unit 110.

Each processing module can be referred to as a node on the network and includes at least one MR to assist in transmitting data packets through photonic waveguides that span between the network nodes. A MR is an optical waveguide which is looped back on itself, such that a resonance occurs when the optical path length of the resonator is exactly a whole number of wavelengths.

During the process of manufacturing, characteristics called FPVs cause amplitude and/or wavelength shifts in data packets passing through photonic communication components including MRs. FPVs can, for example, originate in optical-lithography process imperfections, contributing to different variations in the waveguide thickness and/or line width, waveguide edge roughness and side wall slope, dopant, and other types of variations.

FPVs can also be intentionally created during the manufacturing process in some implementations. In such embodiments, the type of variation and/or its magnitude can be selected and the MR can be modified to exhibit that variation and/or magnitude.

In current systems, FPVs are artifacts that are to be eliminated through use of active tunable MRs that can tune the amplitude and/or wavelengths of the data packets after the data packet passes through a photonic interconnection (by which the FPV affects the packet) and is received by the active tunable MR. In such systems, this decrypting tuning process can, for example, be accomplished via a thermo-optic (TO) tuning approach which is used for FPV correction in MR-based systems.

Although not used for encrypting data packets in the present disclosure, such techniques may be used during the decryption process discussed herein. Thermal tuning is the most widely used FPV tuning technique, but other techniques may also be used to decrypt the data packets.

In embodiments of the present disclosure, rather than tuning out the FPVs, they are used to create a passive encryption mechanism. This mechanism is described in more detail below.

The interconnected photonic network makes use of the FPVs as passive photonic physically unclonable functions (PUFs) for data encryption and retrieval, while making use of the high speed, high bandwidth, and low energy benefits of photonic communication. The description below provides how the interconnection modules/gateways per communication node in this network can be set up and how photonic PUFs can be leveraged.

A PUF is a physical entity (a group of one or more physical characteristics) embodied in a physical structure. From an operational point of view, the PUFs characteristics can be divided into three types. The first type is the MR fiber's input which contains a random number of structural defects (e.g., scratches, scattering centers, impurities, refractive index anomalies etc.). These defects can result from intentional processes, like noise-driven mechanical friction, and/or can be combined with unintentional random effects imposed during manufacturing. When a stimulus (i.e., a particular wavelength or set of wavelengths of light) is projected through the MR, the unique set of physical characteristics described above is reproduced. Only this particular stimulus will result in the reproduction of the unique set of physical characteristics. In this manner, the unique set of physical characteristics can be used as an encryption key.

PUFs depend on the uniqueness of the photonic component's physical microstructure. This microstructure depends on random physical factors introduced during manufacturing. These factors are unpredictable and uncontrollable, which makes it virtually impossible to duplicate or clone the structure. Accordingly, the structure of the MR having FPVs is ideally suitable for use as a PUF.

Rather than embodying a single cryptographic key, PUFs implement a challenge-response type of authentication. Specifically, when a physical stimulus is applied to the physical structure, it reacts in an unpredictable, but repeatable, way due to the complex interaction of the stimulus with the physical microstructure.

This exact microstructure depends on physical factors introduced during manufacture, which are unpredictable. The applied stimulus is called the challenge, and the reaction of the PUF is called the response. A specific challenge and its corresponding response together form a challenge-response pair.

In this manner, the component's identity is established by the properties of the microstructure itself. As this structure is not directly revealed by the challenge-response mechanism, such a device is resistant to spoofing attacks.

The same unique key is reconstructed every time the PUF is evaluated. The challenge-response mechanism is then implemented using cryptography. PUFs can be implemented with a very small hardware investment compared to other cryptographic designs that provide unpredictable input/output behavior, such as pseudo-random functions.

Unclonability means that each PUF component has a unique and unpredictable way of mapping challenges to responses, even if it was manufactured with the same process as a similar component. In other words, given the design of the PUF system, without knowing all of the physical properties of the random components, the resultant output is highly unpredictable.

A PUF, is a physical object that for a given input and conditions (i.e., a security challenge), provides a physically defined "digital fingerprint" output (i.e., a response to the security challenge) that serves as a unique identifier. PUFs, as used herein, are based on unique physical variations occurring naturally during waveguide manufacturing.

Each of the automotive processing modules can be referred to as a node on the photonic network. Each node can be identified by a unique node identifier (node ID). In some embodiments a specific wavelength can be selected for just node ID transmission. The microring resonator (MR) in charge of this can be tuned to allow proper node ID transmission, so that a processing unit can determine that this wavelength is carrying the node ID information and can correctly interpret it.

A single wavelength can carry up to 8 bits of information (8 pulse amplitude modulation also referred to as 8-PAM). Analog systems can have up to 16-bits per wavelength. A 256-bit packet (typical in controller area network (CAN) systems) can conceivably be sent using 16 wavelengths or 32 wavelengths. Given the high bandwidth of photonic waveguides this means multiple packets can be sent simultaneously on the bus (bundle of photonic waveguides), enabling better inter-node communication for e.g., sensor data transmission to controllers.

Fabrication process variation (FPV) causes amplitude and/or wavelength shifts in data packets sent through waveguides in photonic communication systems. A group of MRs (MR bank) without FPV correction, whose FPV characteristics are known as discussed above, can be used to encrypt the signals before they are introduced to the photonic bus (waveguides). Simply passing the signal through the MR bank causes amplitude and wavelength shifts, encrypting the packet. This encryption process occurs without any energy expense because the encryption occurs based on the unique FPV characteristics created in the MRs and/or waveguides.

The decryption unit needs to have a LUT with the unique node IDs and corresponding ($\mu$, $\sigma$) of the encryption MR bank. A Gaussian reversal algorithm can be used to recover the encrypted data along with error correction code (ECC) that can be used to assist in the decrypting process.

Figure 2:
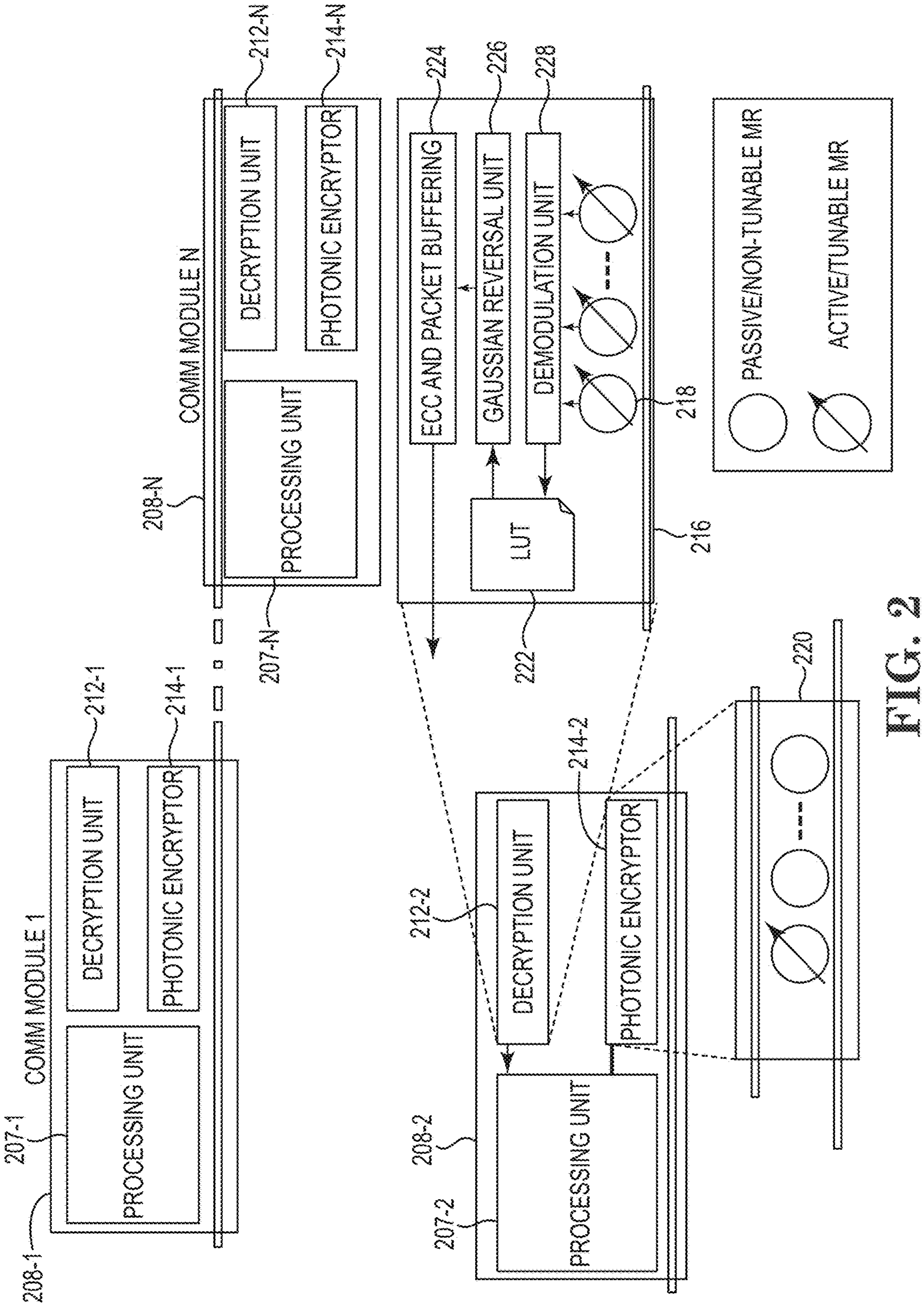
FIG. 2 is a block diagram of a number of photonic component modules that can be utilized within a photonic system in accordance with some embodiments of the present disclosure.

FIG. 2 is a block diagram of a number of photonic component modules that can be utilized within a photonic system in accordance with some embodiments of the present disclosure. FIG. 2 represents components of a photonic network in which embodiments of the present disclosure can be utilized. FIG. 2 illustrates several automotive processing modules 208-1, 208-2, 208-N. The processing modules each have a processing unit 207, a decryption unit 212, and a photonic encryptor 214. These components allow each processing module to send, receive, and process data packets that are encrypted.

As illustrated, in the embodiment of FIG. 2, the encryption unit (photonic encryptor) 214 encrypts the data packets for transmission to a processing unit for processing to determine if an action should be taken based on the data in the data packet. As illustrated at 220, the data packet can include several portions, represented by the circles. The first portion includes the node ID and can be provided via a tunable MR, while the rest of the data packet is passively encoded via the FPV characteristics of the MR through which the data packet is passed. This results in an encrypted data packet that can be sent to a processing unit. An example of how such an encrypted data packet can be decrypted is discussed below.

As illustrated, in the embodiment of FIG. 2, the decryption unit 212 (illustrated relating to 212-2) includes a look up table (LUT) 222, an ECC and packet buffering component 224, a Gaussian reversal unit 226, and a demodulation unit 228. In use, decryption unit 212 receives an encrypted data packet that has been passively encrypted, using the PUF process disclosed herein.

When received, the demodulation unit 228 uses one or more MRs to decrypt the data packet indicated at 218 (wherein the portions of the data packet, represented by the circles, are demodulated by tunable MRs). The decryption unit looks up the node ID to determine the decryption characteristics of the FPV for that particular node and then uses a Gaussian reversal algorithm via the Gaussian reversal unit 226 to decrypt the data packet.

The unencrypted data is then sent to the processing unit for analysis of the data and initiation of any action based on the data analysis by the processing unit 207 (illustrated relating to 207-2). This transmission of the unencrypted data can be accomplished, for example, by an ECC and packet buffering unit 224. These processing units can be part of a larger computing system such as that depicted in FIG. 3.

Figure 3:
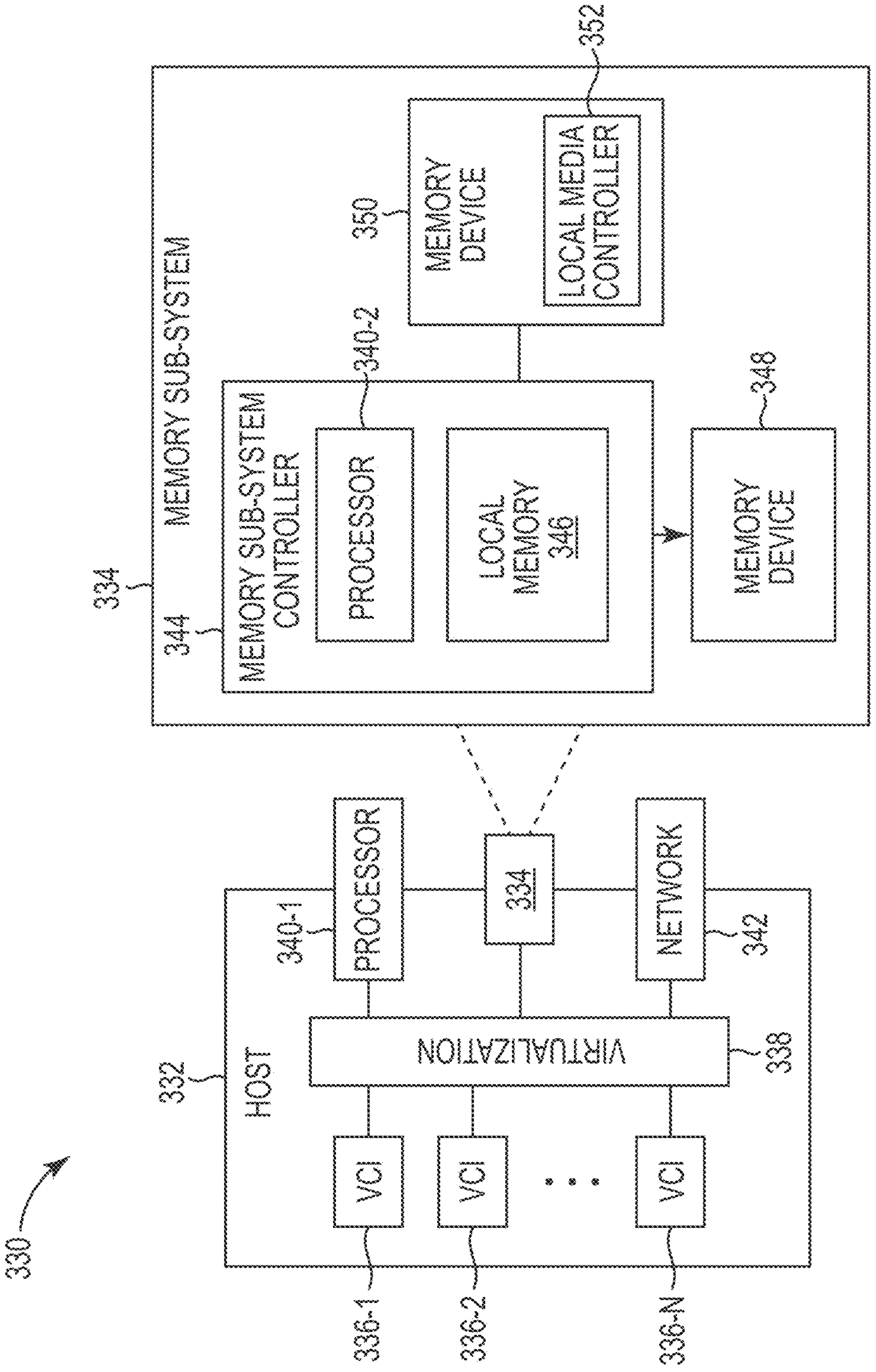
FIG. 3 is a block diagram of an example computer system through which embodiments of the present disclosure may operate.

FIG. 3 is a block diagram of an example computer system through which embodiments of the present disclosure may operate. The computing system 330 includes memory sub-system 334 which can include media, such as one or more volatile memory devices 348, one or more non-volatile memory devices 350, or a combination thereof. The volatile memory devices 348 can be, but are not limited to, random access memory (RAM), such as dynamic random access memory (DRAM), synchronous dynamic random access memory (SDRAM), and resistive DRAM (RDRAM). Such a system can be used to process decrypted data packets to determine an action to be taken and/or can include instructions for encrypting and/or decrypting data packets, among other instructions for accomplishing the tasks discussed herein.

A memory sub-system 334 can be a storage device, a memory module, or a hybrid of a storage device and memory module. Examples of a storage device include an SSD, a flash drive, a universal serial bus (USB) flash drive, an eMMC drive, a UFS drive, a secure digital (SD) card, and a hard disk drive (HDD). In at least one embodiment, the memory sub-system 334 is an automotive grade SSD. Examples of memory modules include a dual in-line memory module (DIMM), a small outline DIMM (SO-DIMM), and various types of non-volatile dual in-line memory module (NVDIMM).

The computing system 330 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 330 includes a host system 332 that is coupled to one or more memory sub-systems 334. In some embodiments, the host system 332 is coupled to different types of memory sub-systems 334. FIG. 3 illustrates an example of a host system 332 coupled to one memory sub-system 334. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 332 includes or is coupled to processing resources, memory resources, and network resources. As used herein, "resources" are physical or virtual components that have a finite availability within a computing system 330. For example, the processing resources include a processing device 340-1 (or a number of processing devices), the memory resources include memory sub-system 334 for secondary storage and main memory devices (not specifically illustrated) for primary storage, and the network resources include as a network interface 342.

The processing device 340-1 can be one or more processor chipsets, which can execute a software stack. The processing device 340-1 can include one or more cores, one or more caches, a memory controller (e.g., NVDIMM controller), and a storage protocol controller (e.g., PCIe controller, SATA controller, etc.). The host system 332 uses the memory sub-system 334, for example, to write data to the memory sub-system 334 and read data from the memory sub-system 334.

The host system 332 can be configured to provide virtualized or non-virtualized access to the memory sub-system 334 and/or the processing resources and network resources. Virtualization can include abstraction, pooling, and automation of the processing, memory, and/or network resources. FIG. 3 generally illustrates the host system 332 providing virtualized access to data packet processing functions.

To provide such virtualization, the host system 332 incorporates a virtualization layer 338 (e.g., hypervisor, virtual machine monitor, etc.) that can execute a number of virtual computing instances (VCIs) 336-1, 336-2, . . . , 336-N. The virtualization layer 338 can provision the VCIs 336 with processing resources and memory resources and can facilitate communication for the VCIs 336 via the network interface 342. The virtualization layer 338 represents an executed instance of software run by the host system 332.

The term "virtual computing instance" covers a range of computing functionality. VCIs may include non-virtualized physical hosts, virtual machines (VMs), and/or containers. The VCIs 336 can therefore represent applications that run on the virtualization layer 338 or on an operating system executed by the host system 332. By way of example, the first VCI 336-1 is an application that provides an instrument cluster for a vehicle, the second VCI 336-2 is an application that provides a black box for the vehicle, and the third VCI 336-N is an application that provides an infotainment system for the vehicle. Embodiments are not limited to these specific examples of applications.

The host system 332 can be coupled to the memory sub-system 334 via a physical host interface. Examples of a physical host interface include, but are not limited to, a serial advanced technology attachment (SATA) interface, a PCIe interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 332 and the memory sub-system 334. The host system 332 can further utilize an NVM Express (NVMe) interface to access the non-volatile memory devices 350 when the memory sub-system 334 is coupled with the host system 332 by the PCIe interface. The physical host interface can provide an interface for passing control, address, data, and other signals between the memory sub-system 334 and the host system 332.

FIG. 3 illustrates a memory sub-system 334 as an example. In general, the host system 332 can access multiple memory sub-systems via a same communication connection, multiple separate communication connections, and/or a combination of communication connections.

The host system 332 can send requests to the memory sub-system 334, for example, to store data in the memory sub-system 334 or to read data from the memory sub-system 334. The data to be written or read, as specified by a host request, is referred to as "host data."

The memory sub-system controller 344 (or controller 344 for simplicity) can communicate with the non-volatile memory devices 350 to perform operations such as reading data, writing data, erasing data, and other such operations at the non-volatile memory devices 350. The memory sub-system controller 344 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 344 can be a microcontroller, special purpose logic circuitry (e.g., a field programmable gate array (FPGA), an ASIC, etc.), or other suitable circuitry.

The memory sub-system controller 344 can include a processing device 340-2 (e.g., a processor) configured to execute instructions stored in local memory 346. In the illustrated example, the local memory 346 of the memory sub-system controller 344 is an embedded memory configured to store instructions for performing various processes, operations, logic flows, and routines that control operation of the memory sub-system 334, including handling communications between the memory sub-system 334 and the host system 332.

In some embodiments, the local memory 346 can include memory registers storing memory pointers, fetched data, etc. The local memory 346 can also include ROM for storing micro-code, for example. While the example memory sub-system 334 in FIG. 3 has been illustrated as including the memory sub-system controller 344, in another embodiment of the present disclosure, a memory sub-system 334 does not include a memory sub-system controller 344, and can instead rely upon external control (e.g., provided by an external host, or by a processor or controller separate from the memory sub-system 334).

In general, the memory sub-system controller 344 can receive information or operations from the host system 332 and can convert the information or operations into instructions or appropriate information to achieve the desired access to the non-volatile memory devices 350 and/or the volatile memory devices 348. The memory sub-system controller 344 can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the non-volatile memory devices 350. The memory sub-system controller 344 can further include host interface circuitry to communicate with the host system 332 via the physical host interface. The host interface circuitry can convert a query received from the host system 332 into a command to access the non-volatile memory devices 350 and/or the volatile memory devices 348 as well as convert responses associated with the non-volatile memory devices 350 and/or the volatile memory devices 348 into information for the host system 332.

Although the following description refers to a processing device and a memory device, the description may also apply to a system with multiple processing devices and multiple memory devices. In such examples, the instructions may be distributed across (e.g., stored by) multiple memory devices and the instructions may be distributed across (e.g., executed by) multiple processing devices.

The memory sub-systems 346/348/350 may comprise memory devices. The memory devices may be electronic, magnetic, optical, or other physical storage device that stores executable instructions. One or both of the memory devices may be, for example, non-volatile or volatile memory. In some examples, one or both of the memory devices is a non-transitory MRM comprising RAM, an Electrically-Erasable Programmable ROM (EEPROM), a storage drive, an optical disc, and the like.

In various examples, the processors can be internal to the memory sub-systems instead of being external to the memory sub-systems. For instance, the processors can be processor in memory (PIM) processors. The processors can be incorporated into the sensing circuitry of the memory sub-systems and/or can be implemented in the periphery of the memory sub-systems, for instance. The processors can be implemented under one or more memory arrays of the memory sub-systems.

Figure 4:
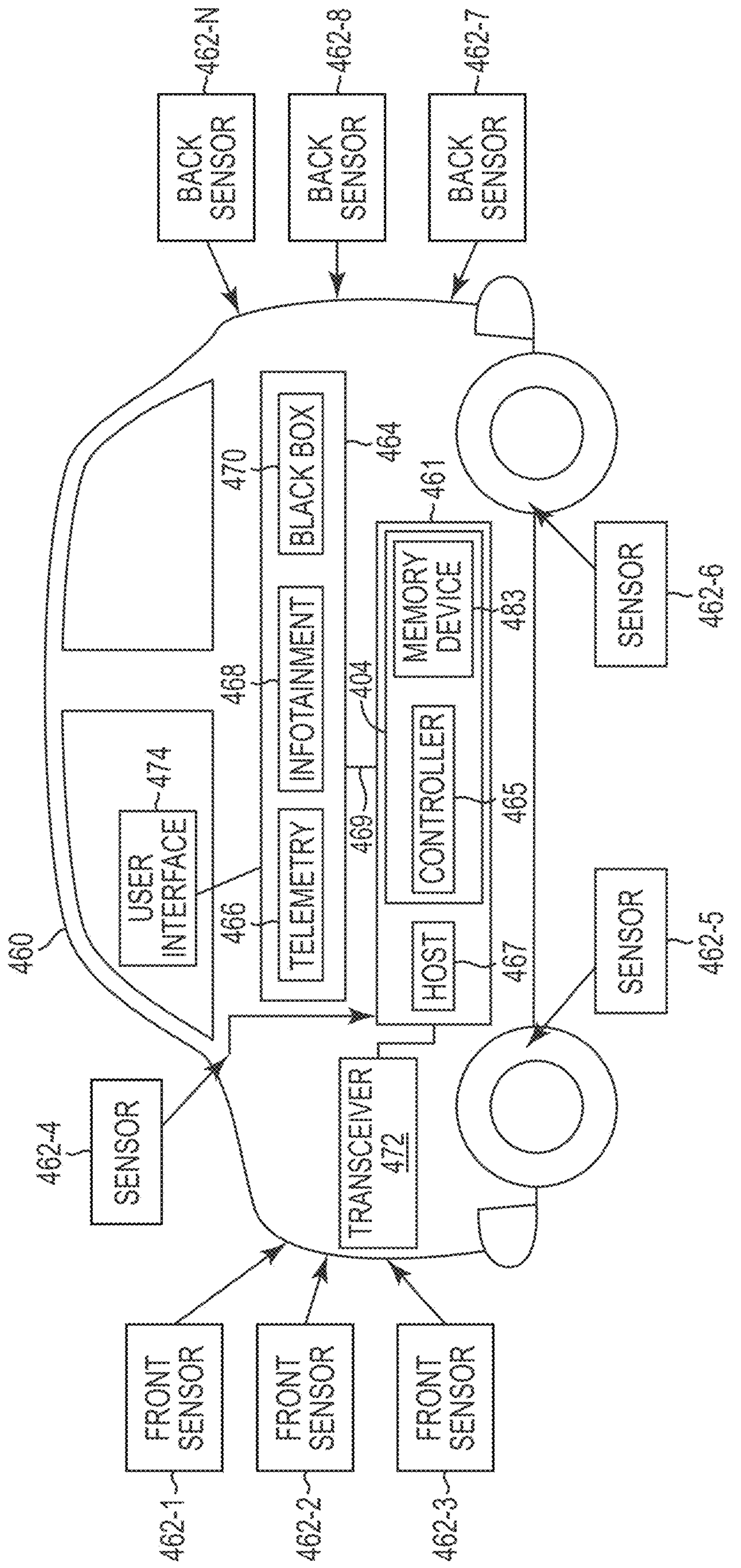
FIG. 4 is another example of a photonic system in accordance with some embodiments of the present disclosure.

FIG. 4 is another example of a photonic system in accordance with some embodiments of the present disclosure. FIG. 4 illustrates an example of a system including a computing system 461 in a vehicle 460 in accordance with some embodiments of the present disclosure. The computing system 461 can include a memory sub-system 404, which is illustrated as including a controller 465 and non-volatile memory device 483 for simplicity but is analogous to the memory sub-system 334 illustrated in FIG. 3.

The computing system 461, and thus the host 467, can be coupled to a number of sensors 462 either directly, as illustrated for the sensor 462-4 or via a transceiver 482 as illustrated for the sensors 462-1, 462-2, 462-3, 462-5, 462-6, 462-7, 462-8, . . . , 462-N. The transceiver 482 is able to receive data from the sensors 462 via a photonic network, such as that described in FIG. 1. In at least one embodiment, each of the sensors 462 is connected directly to the computing system 461 (e.g., via optical waveguides) operated as described herein.

The vehicle 460 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 462 are illustrated in FIG. 4 as including example attributes.

For example, sensors 462-1, 462-2, and 462-3 are cameras collecting data from the front of the vehicle 460. Sensors 462-4, 462-5, and 462-6 are microphone sensors collecting data from the front, middle, and/or back of the vehicle 460. The sensors 462-7, 462-8, and 462-N are cameras collecting data from the back of the vehicle 460. As another example, the sensors 462-5, 462-6 are tire pressure sensors. As another example, the sensor 462-4 is a navigation sensor, such as a global positioning system (GPS) receiver. As another example, the sensor 462-6 is a speedometer. As another example, the sensor 462-4 represents a number of engine sensors such as a temperature sensor, a pressure sensor, a voltmeter, an ammeter, a tachometer, a fuel gauge, etc. As another example, the sensor 462-4 represents a camera. Video data can be received from any of the sensors 462 associated with the vehicle 460 comprising cameras. In at least one embodiment, the video data can be compressed by the host 467 before providing the video data to the memory sub-system 404. All of these data types can be passed through the network as data packets.

The host 467 can execute instructions to provide an overall control system and/or operating system for the vehicle 460. The host 467 can be a controller designed to assist in automation endeavors of the vehicle 460. For example, the host 467 can be an advanced driver assistance system controller (ADAS). An ADAS can monitor data to prevent accidents and provide warning of potentially unsafe situations. For example, the ADAS can monitor sensors in the vehicle 460 and take control of vehicle 460 operations to avoid accident or injury (e.g., to avoid accidents in the case of an incapacitated user of a vehicle). The host 467 may need to act and make decisions quickly to avoid accidents. The memory sub-system 404 can store reference data in the non-volatile memory device 463 such that data from the sensors 462 can be compared to the reference data by the host 467 in order to make quick decisions.

The host 467 can write data received from one or more sensors 462 and store the data (e.g., in association with a black box application 470 for the vehicle). The black box application 470 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 467 can execute instructions to provide a set of applications 464 for the vehicle 460 including telemetry 466, infotainment 468, and a black box 470. The telemetry application 466 can provide information displayable on a user interface 474 such as may be associated with the instrumentation and/or dashboard of a vehicle 460. An example of such telemetric information is the speed at which the vehicle 460 is traveling (e.g., based at least in part on data from a sensor 462). The infotainment application 468 can include information and/or entertainment for a user of the vehicle 460 displayable or interfaced via the user interface 474. Examples of such information and/or entertainment include music, movies, GPS information such as a moving map, etc. The memory sub-system 404 can provide storage for any of the set of applications 464. The set of applications 464 can be virtualized, as described with respect to FIG. 3, with backing storage provided by the memory sub-system 404. The data from all of these sub-systems may be passed as encrypted data packets as discussed herein.

Figure 5:
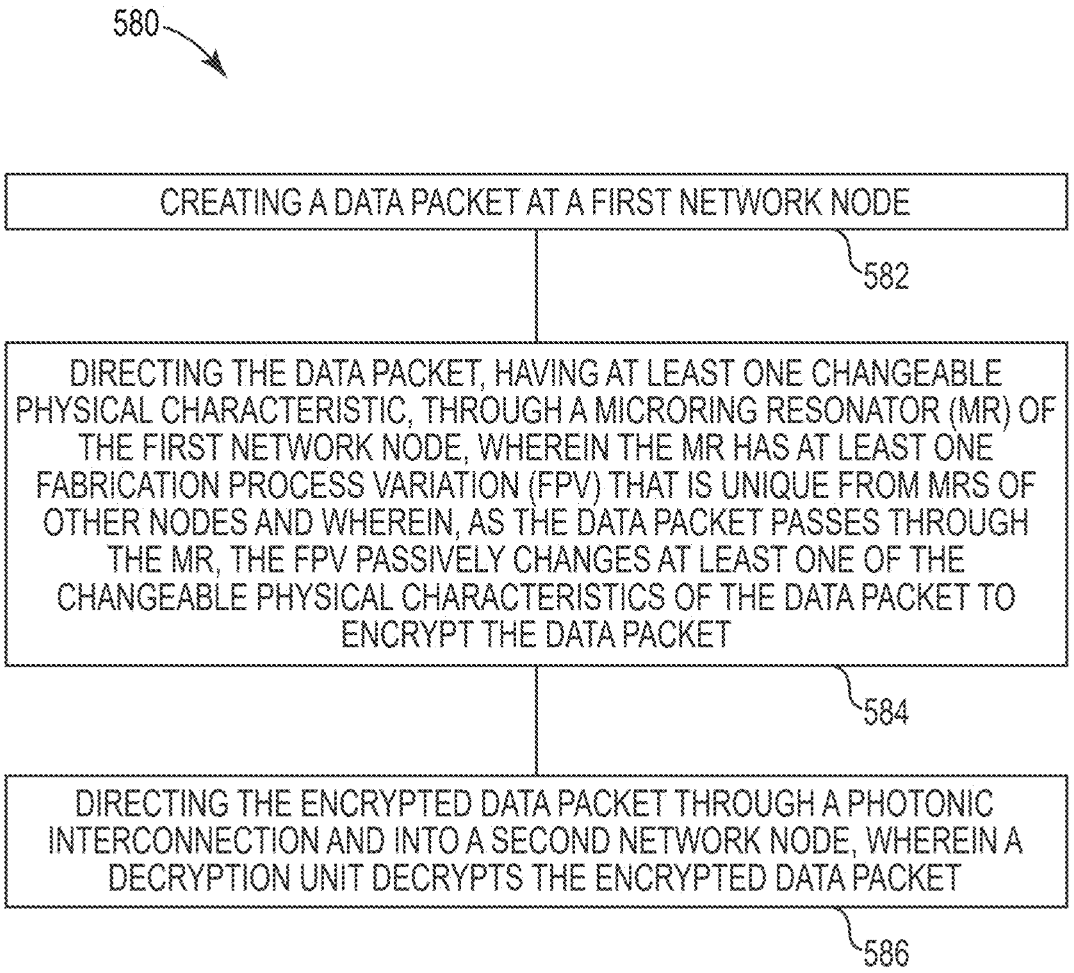
FIG. 5 is a flow diagram corresponding to a method associated with passive photonic physically unclonable functionality for securing an automotive powertrain control area network in accordance with some embodiments of the present disclosure.

FIG. 5 is a flow diagram corresponding to a method associated with passive photonic physically unclonable functionality for securing an automotive powertrain control area network in accordance with some embodiments of the present disclosure.

The method 580 may be performed, in some examples, using a computing system such as those described with respect to FIGS. 2, 3, and 4. An example method embodiment for securing an automotive powertrain control area network by using a passive photonic physically unclonable functionality, includes creating a data packet at a first network node, at block 582.

At block 584, the data packet, having at least one changeable physical characteristic, is directed through a microring resonator (MR) of the first network node, wherein the MR has at least one fabrication process variation (FPV) that is unique from the MRs of the other nodes and wherein, as the data packet passes through the MR, the FPV passively changes at least one of the changeable physical characteristics of the data packet to encrypt the data packet.

In some embodiments, the decryption unit has decryption information about the passive changes made by the FPV. Examples of decryption information are processes that can be used to undo the passive changes that were done when the data packet was passed through a particular MR having unique FPVs.

The nature of FPVs is that they are reproducible if a same stimulus is applied. Accordingly, if a same wavelength or combination of wavelengths are applied, the result is the same. Knowing that predictable result, network security technicians can include process instructions that are executable by the processing unit to undo the passive physical changes made to the changeable physical characteristics of the data packet by the unique FPVs of a particular node and a particular unique stimulus. For instance, process instructions can include a variation in an amplitude of the encrypted data packet and/or a shift in a wavelength of the encrypted data packet that will undo the variation in an amplitude and/or shift in a wavelength that was passively applied by the encrypting MR.

The method also includes directing the encrypted data packet through a photonic interconnection and into a second network node, wherein a decryption unit decrypts the encrypted data packet, at block 586.

In some embodiments, the data packet includes a portion that is actively encrypted. In some such embodiments, a data packet includes a portion that is actively encrypted and the active encryption is accomplished by a tunable MR. For example, the decryption unit can include a tunable MR and the tunable MR is used for decrypting the encrypted data packet.

In embodiments having a decryption unit that includes a look up table (LUT) having a first node identifier, a method can include identifying a second node identifier in the encrypted data packet and comparing the first node identifier and second node identifier to determine if they are the same. The method can also include that, if the first node identifier and second node identifier are the same, then accessing decryption information from the LUT that is associated with the first node identifier.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus having a passive photonic physically unclonable functionality for securing an automotive control area network (CAN), comprising:

a network node configured to be communicatively connected via a photonic interconnect to the automotive CAN, wherein the network node includes:

a set of microring resonators (MRs), at least one of the MRs having a fabrication process variation (FPV) that is unique from MRs of other nodes in the automotive CAN, wherein the network node is configured to pass an optical signal through the set of MRs such that the FPV passively causes a physical characteristic of the data packet to change thereby encrypting the optical signal before transmission via the photonic interconnection.

2. The apparatus of claim 1, wherein a source of the FPV is an optical-lithography process imperfection created when forming the MR.

3. The apparatus of claim 1, wherein the MR has a waveguide and wherein the FPV is a variation in a thickness of the waveguide.

4. The apparatus of claim 1, wherein the MR has a waveguide and wherein the FPV is a variation in a line width of the waveguide.

5. The apparatus of claim 1, wherein the MR has a waveguide and wherein the FPV is a variation in an edge roughness of the waveguide.

6. The apparatus of claim 1, wherein the MR has a waveguide and wherein the FPV is a variation in an inner side wall slope of the waveguide.

7. The apparatus of claim 1, wherein the MR has a waveguide and wherein the FPV is a variation in a dopant of the waveguide.

8. The apparatus of claim 1, wherein the FPV causes a variation in an amplitude of the encrypted data packets.

9. The apparatus of claim 1, wherein the FPV causes a shift in a wavelength of the encrypted data packets.

10. The apparatus of claim 1, wherein the FPV causes a variation in an amplitude of the encrypted data packets and a shift in a wavelength of the encrypted data packets.

11. A method for securing an automotive control area network (CAN) by using a passive photonic physically unclonable functionality, comprising:

directing a data packet from a first network node communicatively connected via a photonic interconnection to the automotive CAN through a microring resonator (MR) of the first network node thereby changing a physical characteristic of the data packet, wherein the MR has a fabrication process variation (FPV) that is unique from MRs of other nodes and wherein the FPV passively changes the physical characteristic of the data packet as it is passed through the MR to encrypt the data packet; and transmitting the encrypted data packet through the photonic interconnection to the automotive CAN and to a second network node.

12. The method of claim 11, wherein the data packet includes a portion that is actively encrypted.

13. The method of claim 11, wherein the data packet includes a portion that is actively encrypted and wherein the active encryption is accomplished by directing the data packet through a tunable MR.

14. The method of claim 11, further comprising receiving the encrypted data packet at the second network node and decrypting the encrypted data packet with a tunable MR of the second network node.

15. The method of claim 11, further comprising receiving the encrypted data packet at the second network node, wherein the second network node stores a look up table (LUT) having a first node identifier and the method includes identifying a second node identifier in the encrypted data packet and comparing the first node identifier and second node identifier to determine if they are the same.

16. The method of claim 15, further comprising accessing decryption information from the LUT that is associated with the first node identifier in response to the first node identifier and second node identifier being the same.

17. A non-transitory machine-readable medium having computer-readable instructions for securing an automotive control area network (CAN) by using a passive photonic physically unclonable functionality, which when executed by a computer, cause the computer to:

direct a data packet through a microring resonator (MR) of a first network node thereby changing a physical characteristic of the data packet, wherein the MR has a fabrication process variation (FPV) that is unique from MRs of other nodes and wherein the FPV passively causes the physical characteristic of the data packet to change thereby encrypting the data packet; and transmit the encrypted data packet through a photonic interconnection through the automotive CAN and to a second network node.

18. The machine-readable medium of claim 17, wherein the second network node stores decryption information about the passive changes made by the FPV.

19. The machine-readable medium of claim 17, wherein the second network node stores decryption information about the changes made to the changeable physical characteristics of the data packet.

20. An apparatus having a passive photonic physically unclonable functionality for securing an automotive control area network (CAN), comprising:

a network node configured to be communicatively connected via a photonic interconnect to the automotive CAN wherein the network node includes:

a memory configured to store a look up table (LUT) with a first node identifier corresponding to another network node and information about a fabrication process variation (FPV) corresponding to a microring resonator (MR) of the other network node, wherein the information about the FPV includes information about a change to a physical characteristic of data packets caused by the FPV; and a processor configured to, in response to the network node receiving a data packet via the photonic interconnect, compare a second node identifier of the received data packet to the first node identifier stored in the LUT and, in response to the two node identifiers matching, decrypt the data packet using the information about the change to the physical characteristic of data packets caused by the FPV stored in the LUT.

21. The apparatus of claim 20, wherein the LUT includes decryption information about changes made by a plurality of FPVs to a plurality of changeable physical characteristics of the data packet.

22. The apparatus of claim 20, further comprising a tunable MR wherein the network node is configured to direct the received data packet through the tunable MR to decrypt the data packet.

* * * * *